Aug. 31, 1954  R. S. DAVIS  2,687,802
MACHINE FOR GRADING OBJECTS BY WEIGHT
Filed June 22, 1949  5 Sheets—Sheet 1

INVENTOR.
Roy S. Davis
BY
Otto A. Earl
Attorney.

Aug. 31, 1954   R. S. DAVIS   2,687,802
MACHINE FOR GRADING OBJECTS BY WEIGHT
Filed June 22, 1949   5 Sheets-Sheet 2

INVENTOR.
Roy S. Davis
BY
Attorney

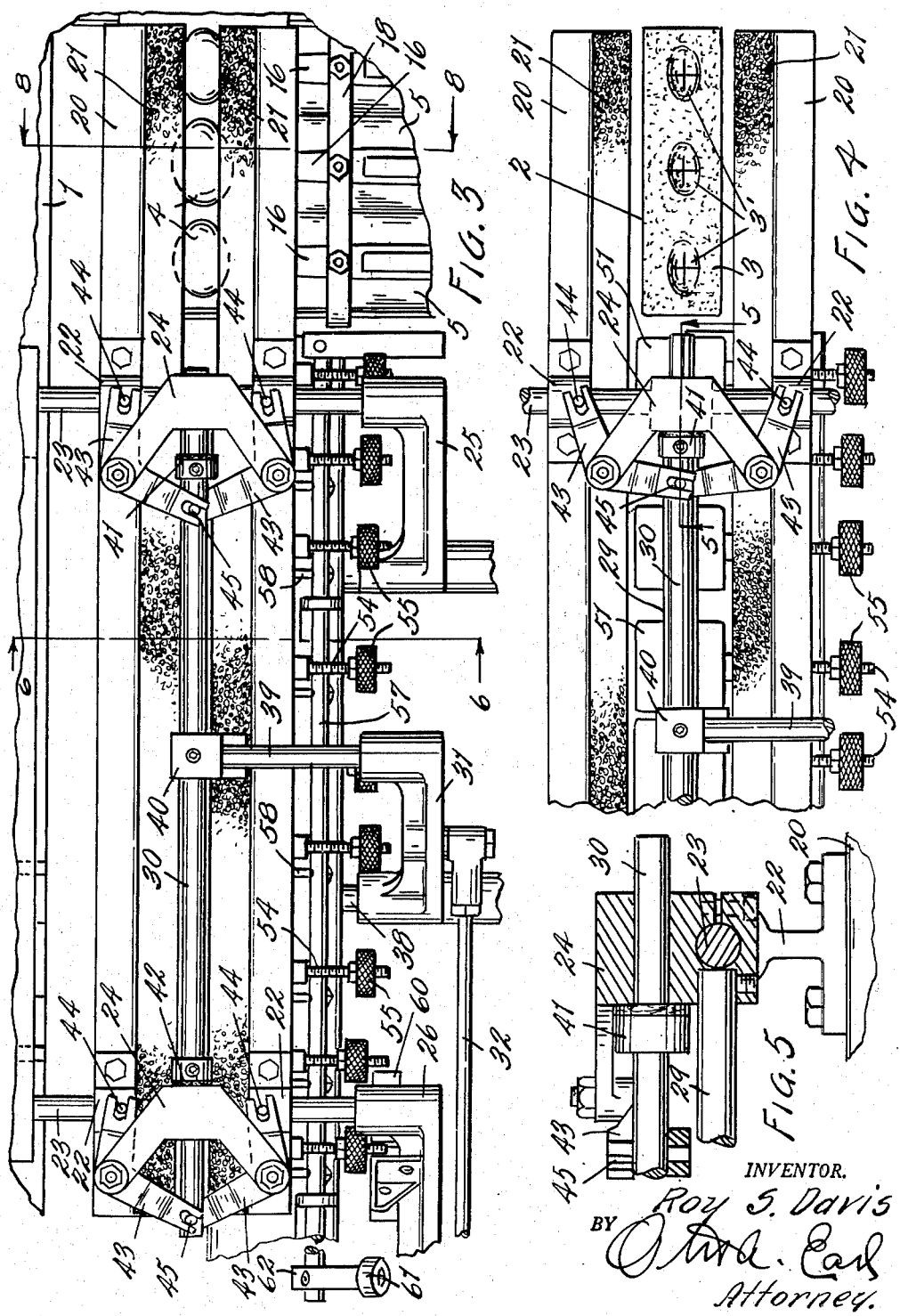

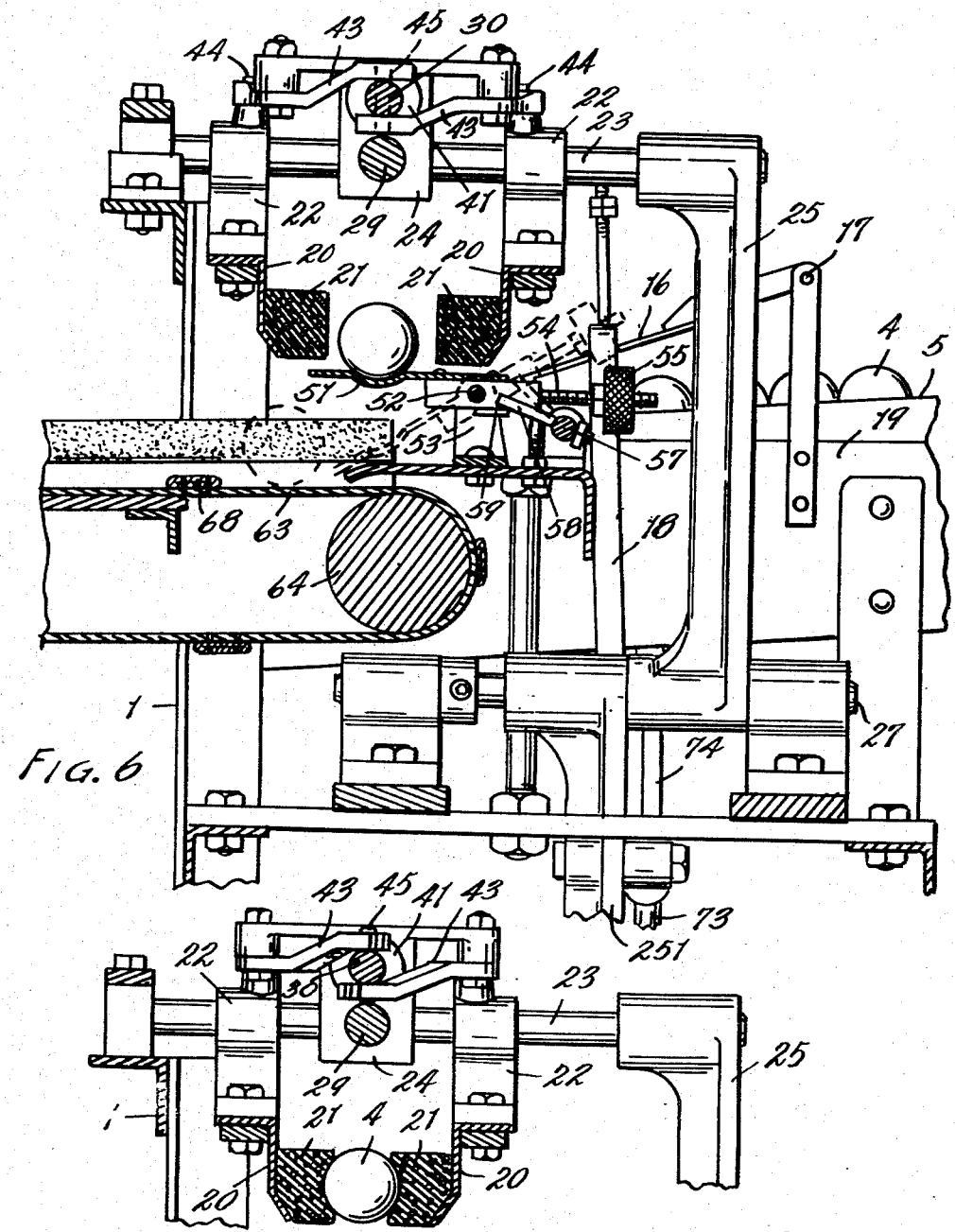

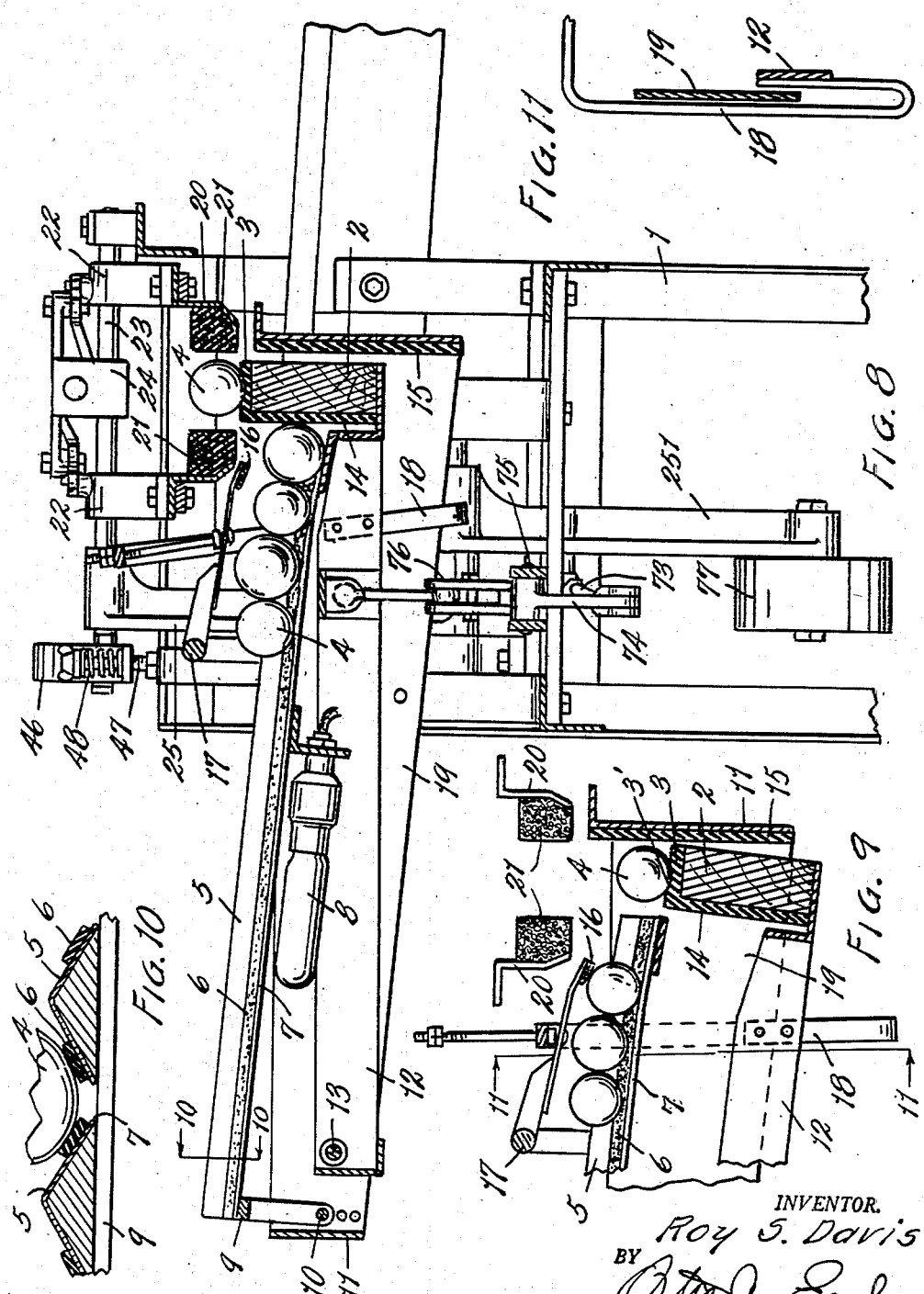

Patented Aug. 31, 1954

2,687,802

UNITED STATES PATENT OFFICE 2,687,802

MACHINE FOR GRADING OBJECTS BY WEIGHT

Roy S. Davis, Otsego, Mich.

Application June 22, 1949, Serial No. 100,666

16 Claims. (Cl. 209—121)

This invention relates to improvements in machine for grading objects by weight.

The main objects of the invention are:

To provide a machine for grading objects by weight which is adapted for the grading or sorting of eggs, and one which is of large capacity and at the same time results in very little breakage.

Second, to provide a grading machine which requires very little manual labor which is largely confined, after the machine is properly adjusted, to supplying the objects to the machine and removing them therefrom.

Third, to provide a machine of this character in which the various operating mechanisms are supported in a manner to afford complete accessibility, both for assembling and the care or maintenance of the machine.

Objects pertaining to details and economies of the invention will definitely appear from the description to follow. The invention is defined in the claims.

A structure which embodies the features of the invention is clearly illustrated in the accompanying drawing, in which:

Fig. 3 is an enlarged fragmentary plan view, certain parts being omitted and others broken away, with the feed jaws illustrated at the forward end of their stroke and in closed position.

Fig. 4 is a fragmentary plan view with the feed jaws in open position at the rear end of their stroke, and the actuating parts in position for the return stroke of the jaws.

Fig. 5 is an enlarged fragmentary view partially in section on a line corresponding to line 5—5 of Fig. 4.

Fig. 6 is an enlarged fragmentary view on a line corresponding to line 6—6 of Fig. 3, but with the jaws in open position.

Fig. 7 is a fragmentary view partially in section of certain of the parts of Fig. 6 with the jaws in closed position.

Fig. 8 is an enlarged fragmentary view on a line corresponding to line 8—8 of Fig. 3 showing details of the feed means, the feed elevator being in actuated position.

Fig. 9 is a fragmentary view of certain of the parts of Fig. 8 with the feed elevator in retracted position.

Fig. 10 is an enlarged fragmentary view on a line corresponding to line 10—10 of Fig. 8.

Fig. 11 is a fragmentary view partially in section on line 11—11 of Fig. 9.

Figure 1:
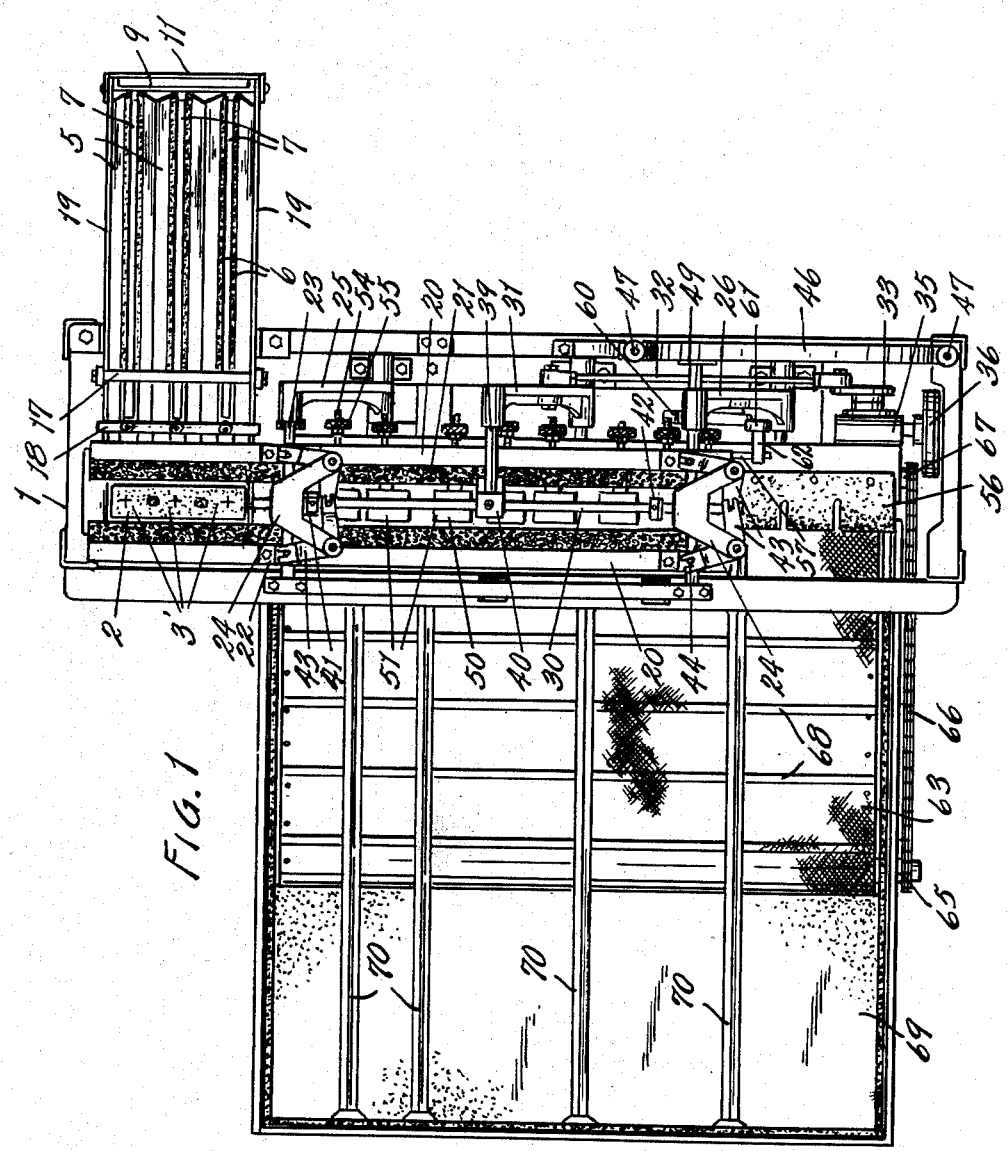
Fig. 1 is a plan view of a grading or sorting machine embodying my invention, certain of the parts being conventionally illustrated.

The machine illustrated is particularly designed for the grading or sorting of eggs by weight, various features of the machine being adapted and useful for grading other objects to be sorted by weight. The details of the embodiment illustrated are adapted for handling fragile objects.

The frame designated generally by the numeral 1 is designed to support the various parts in their proper relationship and will not be described in detail except as reference will be made to parts thereof with which parts to be described are directly associated or supported. The frame illustrated is largely made up of available structural material.

Generally stated, the machine comprises means for feeding or supplying objects to be sorted to a vertically reciprocating elevator or support which is adapted to receive a plurality of the objects in alined relation. A series of scales are disposed in alined relation, desirably divided into groups. The scales of the several groups are graduated so that objects of predetermined weight will actuate the scales of the first group and objects of a lesser weight will actuate a succeeding group.

The objects to be sorted are translated with a step-by-step movement from the feed support to the scales. They are automatically delivered by the scales to a delivery conveyor in grouped or sorted relation. As stated, the machine illustrated is especially designed for sorting eggs and therefore the term "eggs" will be used in the description, but it will be understood that other objects may be sorted by the machine.

The feed or positioning elevator or member 2 is provided with a rubber or resilient seat 3 for eggs 4, this seat having recesses or pockets 3' therein adapted to receive and support the eggs in alined relation. The structure illustrated is designed to receive three eggs at a time. A series of three parallel feed chutes 5 are provided. These are of V section and each is adapted to receive a row of eggs as indicated in Fig. 9, the chutes being provided with resilient strips 6 to cushion the eggs as they are placed in the chutes. In this embodiment the eggs are placed in the chutes by hand.

The chutes have slots 7 in the bottoms thereof permitting the passage of light therethrough from lamps 8 arranged below the chutes so that the eggs are illuminated in the chutes and may be inspected or candled while on the chutes. The chutes are inclined and the support 9 for the outer ends thereof is adjustably supported at 10 on the laterally projecting supporting frame 11.

The member 2 is provided with relatively long supporting arms 12 projecting under the feed chute and pivotally supported on the frame 11 at 13. The member 2 constitutes a gate for the feed chutes and has a resilient side facing 14. It is in chute closing position when it is elevated as shown in Fig. 8. When the member 2 is in lowered position the forward eggs in the chutes are discharged upon the feed elevator (Fig. 9). The rear portion of the frame 11 is provided with a rubber facing 15 to cushion the eggs if they should roll entirely across the feed elevator.

To restrain the eggs at the rear of the eggs delivered on the feed conveyor, I provide a stop member 16 which is adapted to engage and restrain the second or following eggs in the chute as shown in Fig. 9. This stop is pivotally mounted at 17 and is connected by the links 18 to the arms 12. These links 18 are looped to pass around the side members 19 of the subframe 11.

The feed elevator is operated in timed relation to certain other parts, the operation of which will now be described. The feed jaws 20 are provided with resilient faces 21 preferably of quite yielding sponge rubber of substantial section. These feed jaws are supported by hangers 22 slidably mounted on the crossheads comprising the rod members 23 having forked head members 24 secured centrally thereto. The rods of the crossheads are carried by rocker arms 25 and 26 pivotally mounted at 27 and 28, respectively. The arms 25 and 26 are relatively long so that there is no objectionable vertical movement of the jaws as they are reciprocated. The crossheads are connected by the rod 29. The crossheads are reciprocated and the jaws are opened and closed by the actuating rod 30 which is actuated through the arm 31 connected by the pitman or connecting rod 32 to the crank 33 on the driven shaft 34 projecting from the transmission 35. This transmission is connected by the belt 36 to the shaft of the motor 37.

The arm 31 is mounted at 38 and is provided with a laterally projecting portion 39 engaging the block 40 on the actuating rod. The actuating rod is provided with tappets 41 and 42 which coact with the crossheads to reciprocate the crossheads.

The jaws are opened and closed by means of the bell crank levers 43, one arm of each lever having a pin and slot connection designated generally by the numeral 44 to the hangers 22 of the jaws, the other arms having pin and slot connections designated generally by the numerals 45 to the actuating rod. The tappets are so arranged that the jaws are opened and closed prior to the reciprocation of the crossheads.

To insure this actuation and to check or brake the movement at the ends of the stroke, I provide a curved friction brake element 46 supported on the pins 47 and biased by the springs 48 against the brake shoe 49 carried by the rear crosshead. This serves as a shock absorber and also as a retarder permitting the opening and closing of the jaws before the reciprocation thereof. The eggs are picked up from the feed member 2 by the closing of the jaws thereon and carried by the reciprocation of the jaws to a series of scales designated generally by the numeral 50 and each comprising a scale pan 51 pivoted at 52 on suitable supporting brackets 53 and having weight arms 54 provided with adjustable weights 55. In the embodiment illustrated there are nine of these scale pans and they are arranged in three groups of three scales each. The scales constituting each group are desirably adjusted to the same weight, those of the first group being adjusted to be actuated by objects of maximum weight, the second group by objects of a lesser weight, and the third group by objects of still less weight. A receiving apron 56 is provided, adapted to receive what might be called the culls.

Figure 2:
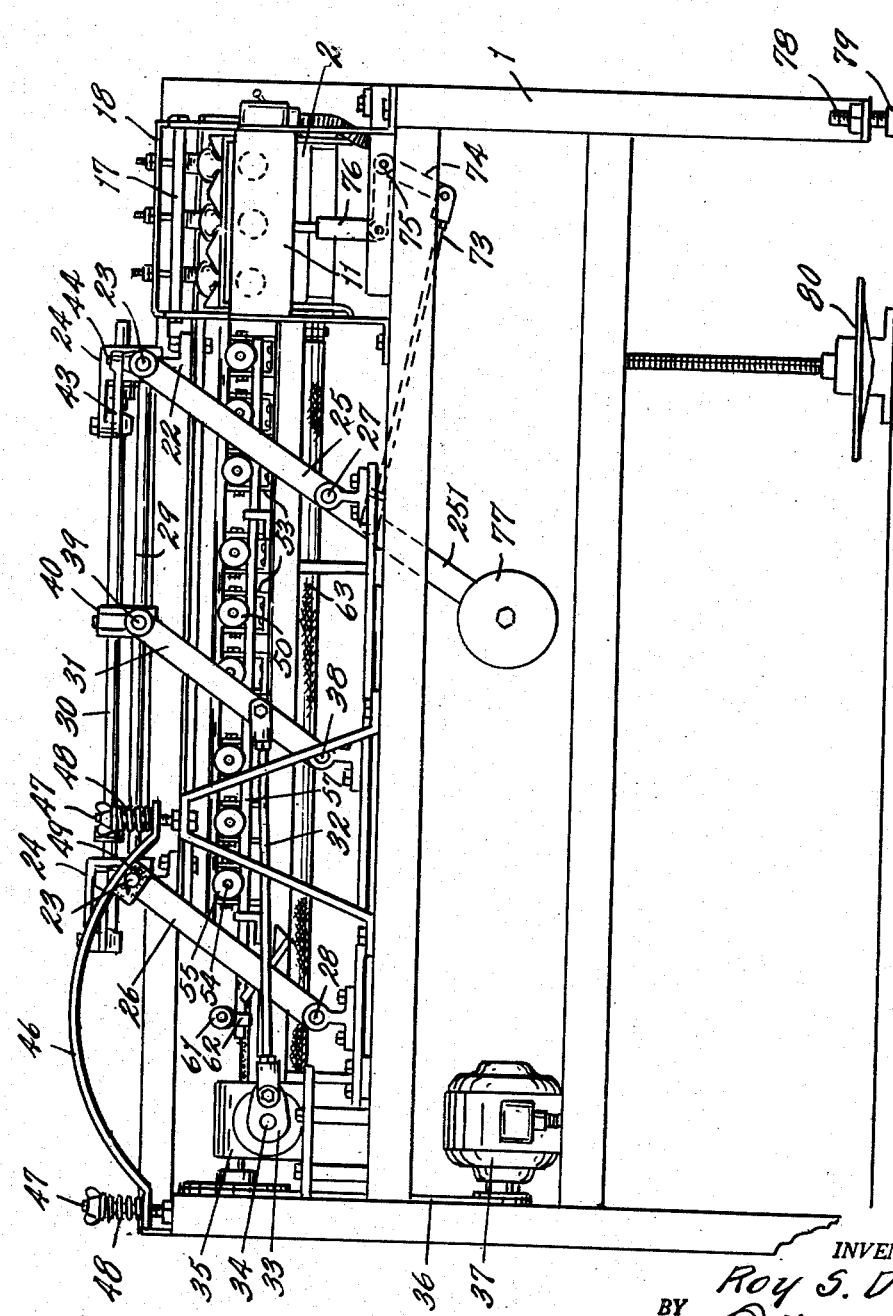
Fig. 2 is a side elevational view, viewed from the right of Fig. 1, certain parts being broken away.

With this arrangement the jaws pick up the three eggs on the feed or supply member and translate them to the first group of scale members. If they are of the predetermined maximum weight, or above, they are discharged from the scales of the first group; if they are below such weight they are translated on the next actuation of the jaws to the second group of scales, or such of them are translated as were of less weight than that required to actuate the first jaws, and so on. It is of considerable importance that the scale pans shall not teeter or discharge the eggs except at a predetermined time synchronized with other operations, and to control this actuation I provide a rockshaft 57 having a plurality of fingers 58 which engage the lugs 59 on the scales, holding them in erected position as shown by full lines in Fig. 6. When the rockshaft is actuated it allows the scale pan to tilt under the load as indicated by dotted lines in Fig. 6. The rockshaft 57 is actuated in timed relation to the actuation of the feed jaws by means of the tappet 60 on the rocker 26 which engages the roller 61 on the arm 62 of the rockshaft, see Figs. 2 and 3.

The eggs are discharged from the scale pans upon the delivery belt 63 supported by the rollers 64 and 65. The roller 65 is driven by the chain 66 from the shaft 67 projecting from the transmission 35. The delivery belt is provided with a plurality of flights 68. These flights are spaced on the belt and the belt is driven at such speeds that it is advanced the distance between a pair of adjacent flights during the period required for each feed jaw actuation.

The discharge conveyor discharges upon the receiving table 69 which is divided by a plurality of partitioning bars 70 which extend longitudinally above the conveyor belt and which are spaced so that the eggs delivered from certain of the scales are discharged in their sorted relation. The apron 56 which receives the culls discharges them into a partitioned space and they are thereby kept in a separated relation.

The feed elevator 2 and the stop or retaining member 16 are also actuated in timed relation by means of the connecting rod 73 connected to the forward rocker 251, the connecting rod being in turn connected to one arm of the bell crank lever 74 pivoted at 75. The other arm of the lever is connected by the links 76 to the supporting arms 12 of the feed member 2, see Figs. 2 and 8. The forward rocker 251 is provided with a counterweight 77 which also serves to minimize shock and vibration incident to reversing the movement of the parts.

It is desirable that the machine be kept at proper level and to that end I provide an adjusting jackscrew 78 and the legs or certain of them are provided with adjustable foot members 79. This takes care of irregularities in the supporting surface and enables proper leveling of the table. A foot actuated switch 80 is provided for the motor 37.

The embodiment of the invention illustrated is highly efficient in the sorting of eggs although it is adaptable for embodiment in the sorting of other objects by weight, as pointed out. I have not attempted to illustrate such embodiments or adaptations as it is believed the disclosure made will enable such adaptations as may be desired.

Having thus described my invention, what I claim as new and desire to secure by Letters Patent is:

1. In a machine of the class described, the combination of a plurality of inclined parallel feed chutes, a vertically reciprocable feed elevator having longitudinally spaced pockets adapted when the elevator is in lowered position to receive eggs from said chutes and constituting a gate for the chutes when raised, stops acting to restrain the eggs in the chutes rearwardly of the forward eggs therein as the forward eggs are discharged upon the feed elevator, opposed elongated resiliently faced feed jaws mounted for longitudinal movement over said elevator and extending therebehind and adapted for transverse closing and opening movement, a plurality of independently adjustable scales having pans arranged in series longitudinally under the jaws and adapted to individually discharge eggs whose weight exceeds the adjusted balance of its scale, means for reciprocating said jaws, means for closing the jaws at the forward end of their stroke to engage eggs on the elevator and pans and for opening them at the rear end of their stroke, a delivery conveyor disposed transversely of the feed jaws and with its inner end below the scale pans to receive the eggs discharged therefrom, said delivery conveyor having spaced flights, a delivery table to which said conveyor discharges, said delivery table being provided with a plurality of spaced parallel partitioning bars extending above said delivery conveyor longitudinally and spaced to receive between them the eggs discharged from certain scales, and means for actuating said feed elevator and stops in timed relation to the actuation of said feed jaws.

2. In a machine of the class described, the combination of a plurality of inclined parallel feed chutes, a vertically reciprocable feed elevator having longitudinally spaced pockets adapted when the elevator is in lowered position to receive eggs from said chutes and constituting a gate for the chutes when raised, stops acting to restrain the eggs in the chutes rearwardly of the forward eggs therein as the forward eggs are discharged upon the feed elevator, opposed elongated resiliently faced feed jaws mounted for longitudinal movement over said elevator and extending therebehind and adapted for transverse closing and opening movement, a plurality of independently adjustable scales having pans arranged in series longitudinally under the jaws and adapted to individually discharge eggs whose weight exceeds the adjusted balance of its scale, means for reciprocating said jaws, means for closing the jaws at the forward end of their stroke to engage eggs on the elevator and pans and for opening them at the rear end of their stroke, and means for actuating said feed elevator and stops in timed relation to the actuation of said feed jaws.

3. In a machine of the class described, the combination of a plurality of inclined parallel feed chutes, a vertically reciprocable feed elevator adapted when the elevator is in lowered position to receive eggs from said chutes and constituting a gate for the chutes when raised, stops acting to restrain the eggs in the chutes at the rear of the forward eggs therein when the forward eggs are discharged upon the feed elevator, opposed elongated resiliently faced feed jaws mounted for longitudinal movement over said elevator and extending longitudinally therebeyond and adapted for transverse closing and opening movement, a plurality of receivers each adapted to support an egg and arranged at classifying stations in series longitudinally of the jaws to receive the eggs translated by said jaws, means for reciprocating said jaws, means for closing the jaws at the forward end of their stroke to engage eggs supported on the elevator and said receivers and for opening the jaws at the rear end of their stroke, a delivery conveyor disposed transversely of the jaws and with its inner end below the receivers to receive the eggs discharged therefrom and having flight bars to advance eggs individually and separately, a plurality of spaced parallel positioning bars extending above said delivery conveyor and spaced to receive eggs discharged from certain receivers, and means for actuating said feed elevator and stops in timed relation to the actuation of said feed jaws.

4. In a machine of the class described, the combination of a plurality of inclined parallel feed chutes, a vertically reciprocable feed elevator adapted when the elevator is in lowered position to receive eggs from said chutes and constituting a gate for the chutes when raised, stops acting to restrain the eggs in the chutes at the rear of the forward eggs therein when the forward eggs are discharged upon the feed elevator, opposed elongated resiliently faced feed jaws mounted for longitudinal movement over said elevator and extending longitudinally therebeyond and adapted for transverse closing and opening movement, a plurality of receivers each adapted to support an egg and arranged at classifying stations in series longitudinally of the jaws, means for reciprocating said jaws, means for closing the jaws at the forward end of their strokes to engage eggs supported on the elevator and said receivers and for opening the jaws at the rear end of their stroke, and means for actuating said feed elevator and stops in timed relation to the actuation of said feed jaws.

5. In a sorting machine, the combination of means for supporting a plurality of objects to be sorted in spaced alignment, a series of classifying stations having receivers aligned with said supporting means, rocker arms provided with crossheads spaced longitudinally along said series of receivers, one of said arms being provided with a counterweight, opposed elongated jaws transversely slidably mounted on said crossheads for opening and closing adjustment across the tops of said receivers and said supporting means, a reciprocatingly mounted actuating rod slidably carried by said heads, bell crank levers pivotally mounted on said crossheads, corresponding arms of said levers having pin and slot connections to said jaws and to said actuating rod, tappets on said actuating rod coacting alternately with the crossheads and positioned so that the jaws are opened and closed prior to the longitudinal actuation of the jaws, and a brake means comprising a curved resiliently supported friction member and a shoe connected to one of said crossheads and coacting with said friction member.

6. In a sorting machine, the combination of means for supporting a plurality of objects to be sorted in spaced alignment, a series of classifying stations having receivers aligned with said supporting means, rocker arms provided with crossheads spaced longitudinally along said series of receivers, opposed elongated jaws transversely slidably mounted on said crossheads for opening and closing adjustment across the tops of said receivers and said supporting means, a reciprocatingly mounted actuating rod slidably carried by said heads, bell crank levers pivotally mounted on said crossheads, corresponding arms of said levers having pin and slot connections to said jaws and to said actuating rod, and tappets on said actuating rod coacting alternately with the crossheads and positioned so that the jaws are opened and closed prior to the longitudinal actuation of the jaws.

7. In a sorting machine, the combination of means for supporting a plurality of objects to be sorted in spaced alignment, a series of classifying stations having receivers aligned with said supporting means, crossheads mounted for reciprocating movement longitudinally over said receivers and said supporting means, opposed elongated jaws mounted on said crossheads for transverse opening and closing adjustment across the tops of said receivers and said supporting means, a reciprocatingly mounted actuating rod, bell crank levers pivotally mounted on said crossheads, corresponding arms of said levers being connected to said jaws and to said actuating rod, tappets on said actuating rod coacting alternately with the crossheads and positioned so that the jaws are opened and closed prior to the longitudinal actuation of the jaws, and shock absorbing means operatively associated with the longitudinally reciprocating crossheads.

8. In a sorting machine, the combination of means for supporting a plurality of objects to be sorted in spaced alignment, a series of classifying stations having receivers aligned with said supporting means, crossheads mounted for reciprocating movement longitudinally over said receivers and said supporting means, opposed elongated jaws mounted on said crossheads for transverse opening and closing adjustment across the tops of said receivers and said supporting means, a reciprocatingly mounted actuating rod, bell crank levers pivotally mounted on said crossheads, corresponding arms of said levers being connected to said jaws and to said actuating rod, and tappets on said actuating rod coacting alternately with the crossheads and positioned so that the jaws are opened and closed prior to the longitudinal actuation of the jaws.

9. In a sorting machine, the combination of means for supporting a plurality of objects to be sorted in spaced alignment, a series of classifying stations having receivers aligned with said supporting means, crossheads mounted for reciprocating movement longitudinally over said receivers and said supporting means, opposed elongated jaws transversely slidably mounted on said crossheads for opening and closing adjustment relative to objects supported on said receivers and said supporting means, a reciprocatingly mounted actuating rod having a lost motion connection to said crossheads and operatively connected to said jaws to close and open them at the ends of their stroke, and a brake means comprising a curved resiliently supported friction member and a pivotally mounted arm connected to one of said crossheads and provided with a shoe coacting with said friction member.

10. In a machine for sorting objects, the combination with means for supporting a plurality of objects to be sorted in spaced aligned relation, a series of receivers positioned at classifying stations and aligned with said supporting means, crossheads mounted for reciprocating movement longitudinally over said receivers and said supporting means, opposed jaws transversely slidably mounted on said crossheads for opening and closing adjustment relative to each other and on opposite sides of said objects, a reciprocatingly mounted actuating member having a lost motion connection to said crossheads and operatively connected to said jaws to close them at the end of their forward stroke and to open them at the end of their rearward stroke, and movement resisting means operatively and yieldably associated with said longitudinally reciprocating crossheads.

11. In a machine for sorting objects, the combination with means for supporting a plurality of objects to be sorted in spaced aligned relation, a series of receivers positioned at classifying stations and aligned with said supporting means, crossheads mounted for reciprocating movement longitudinally over said receivers and said supporting means, opposed jaws transversely slidably mounted on said crossheads for opening and closing adjustment relative to each other and on opposite sides of said objects, a reciprocatingly mounted actuating member having a lost motion connection to said crossheads and operatively connected to said jaws to close them at the end of their forward stroke and to open them at the end of their rearward stroke.

12. In an egg sorting machine having a support adapted to receive and support a plurality of eggs in alignment and a plurality of scales having pans arranged longitudinally in alignment with said eggs, means for successively advancing a plurality of the eggs from said support along said series of pans in a group, said scales and pans being individually adjustable to discharge eggs exceeding a predetermined weight by tilting of the pans to cause the eggs to roll transversely therefrom, and a continuous belt delivery conveyor having one end positioned under said pans to receive eggs therefrom and extending transversely from the line of said pans, said conveyor having stops thereon adapted to intercept and stop eggs rolled from said pans and means connected to drive said conveyor to advance a stop thereon past said pans prior to each actuation of said advancing means to deposit eggs on said pans.

13. In combination with an egg sorting machine having a plurality of scale pans arranged in alignment and each adapted to discharge eggs exceeding a predetermined weight by tilting of the pans to cause the eggs to roll transversely therefrom, a continuous belt delivery conveyor having one end positioned closely adjacent said pans to receive eggs discharged therefrom, and stops on said conveyor adapted to intercept and stop eggs rolled from said pans, and means connected to drive said conveyor to advance a stop thereon past said pans prior to each actuation of said scales.

14. In a machine for sorting fragile articles by weight and having a series of scales and a support element arranged to support said objects in alignment, translating mechanism for advancing said objects from said support and along said series of scales comprising, jaw supporting means supported over said support element and scales for arcuate oscillating movement thereover, jaws mounted on said support means for transverse opening and closing motion from opposite sides of objects on said support element and said scales, a jaw actuating member slidingly supported on said jaw supporting means and extending longitudinally thereof, an oscillating driving member connected to said jaw actuating member to reciprocate the same independently of said jaw supporting means, means forming driving connections between said jaws and jaw actuating member to open and close said jaws upon movement of said jaw actuating member oppositely with respect to said jaw supporting means, and means oscillatively driven in timed relation with said jaw actuating member and engageable with said jaw supporting means to oscillate said supporting means and said jaws after said jaws have been moved transversely.

15. A sorting machine comprising, a support for a number of objects arranged in alignment, opposed elongated continuous resiliently faced feeding jaws actuated for longitudinal reciprocating movement and for transverse opening and closing movements relative to the objects on said support and over said support, a plurality of aligned groups of classifying stations having receivers arranged to receive objects translated by said jaws, each of said groups including as many receivers as the number of objects adapted to be accommodated on said support, said stations being adapted to discharge selected objects by tilting of said receivers to roll objects therefrom transversely of the line of receivers, said jaws being as long as the line of said receivers, a belt conveyor disposed with one end below said receivers to receive objects discharged therefrom and extending transversely from the line of said receivers, said conveyor having transverse stops adapted to intercept and stop successive objects discharged by said receivers longitudinally along said conveyor, a delivery table to which said conveyor discharges, said conveyor and table having coacting dividers for maintaining objects discharged from each group of said receivers in separated groups, and means connected to drive said conveyor in timed relation with said jaws whereby a stop on the conveyor is advanced under said receivers each time said jaws are reciprocated to advance objects along the line of receivers.

16. In a sorting machine, the combination of a support for a plurality of aligned objects to be sorted, coacting elongated jaws having continuous opposed soft resilient facings and mounted for longitudinal reciprocating and transverse opening and closing movements relative to objects on said support and over said support, and a series of receivers positioned in groups at sorting stations and disposed in alignment under said jaws to receive objects translated by said jaws, each of said groups including as many receivers as the number of objects adapted to be located on said support, said jaws being as long as the line of said receivers.

References Cited in the file of this patent

UNITED STATES PATENTS

| Number | Name | Date |
|---|---|---|
| 1,199,184 | Hubmann | Sept. 26, 1916 |
| 1,239,819 | Peters | Sept. 11, 1917 |
| 1,429,092 | Paranteau | Sept. 12, 1922 |
| 1,560,373 | Birnstock | Nov. 3, 1925 |
| 1,597,536 | Murray | Aug. 24, 1926 |
| 1,607,932 | Whitmore | Nov. 23, 1926 |
| 1,959,237 | Hiscock | May 15, 1934 |
| 2,093,338 | Niederer | Sept. 14, 1937 |
| 2,112,259 | Wyland | Mar. 29, 1938 |
| 2,246,597 | Niederer | June 24, 1941 |
| 2,381,035 | Campbell | Aug. 7, 1945 |